United States Patent [19]
Bliss

[11] Patent Number: 5,335,055
[45] Date of Patent: Aug. 2, 1994

[54] BIDIRECTIONAL TONING PROCESS

[75] Inventor: Arthur E. Bliss, Sunnyvale, Calif.

[73] Assignee: Phoenix Precision Graphics, Inc., Sunnyvale, Calif.

[21] Appl. No.: 65,215

[22] Filed: May 20, 1993

[51] Int. Cl.⁵ .............................................. G03G 15/01
[52] U.S. Cl. ................... 355/326 R; 355/327; 346/157; 346/160; 430/42
[58] Field of Search .......... 355/326 R, 327; 430/42, 430/44; 346/108, 136, 157, 160

[56] References Cited

U.S. PATENT DOCUMENTS

| | | | |
|---|---|---|---|
| 4,569,584 | 2/1986 | St. John et al. | 346/157 X |
| 4,728,987 | 3/1988 | Diola et al. | 355/245 |
| 4,733,270 | 3/1988 | Nishikawa et al. | 346/157 X |
| 4,965,597 | 10/1990 | Ohigashi et al. | 346/157 |
| 5,025,269 | 6/1991 | Saeki et al. | 346/157 X |
| 5,063,398 | 11/1991 | Murai et al. | 346/157 |
| 5,148,220 | 9/1992 | Hilbert et al. | 355/245 |

Primary Examiner—Matthew S. Smith
Attorney, Agent, or Firm—Schneck & McHugh

[57] ABSTRACT

A toning method for electrostatic printers and copiers where paper is wound on a supply roll and moved toward a takeup roll. After a latent image of a first color is written and the image area is wound toward a takeup roll, toner of a first color is applied while rewinding the image bearing web toward the supply roll. After the image area passes the writing head, the web is stopped and reversed so that a latent image corresponding to a second color may be written. Once the image region passes toning stations, the web is stopped and again reversed. During reverse direction travel of the image region, toner of a second color is applied and the image region is again wound on the supply roll. The process continues for toning all colors during the rewind operation. Although the image area may move at variable speeds during image writing, the image area is moved at constant speed in the reverse direction for toning. Motion at constant speed allows higher quality toners to be used, leading to improvement in color saturation and hue.

14 Claims, 1 Drawing Sheet

BIDIRECTIONAL TONING PROCESS

TECHNICAL FIELD

The invention relates to electrostatic printers and copiers.

BACKGROUND ART

In computer driven color printing and plotting, particularly in situations involving large images, it is convenient for space-saving and web-control reasons to move a paper or film web back and forth from a supply roll to a takeup roll. Between paper supply and takeup rolls an electrostatic writing head forms latent images, one color at a time, with all colors in registration, and a downstream toner station develops the latent images, which overlay each other to form a single color image.

The writing head may be a small writing head of the scanning or shuttle type, moving back and forth across the width of the web, or it may be a full-width head. The toning station provides yellow, magenta, cyan and black toner in separate toning passes, one color for each pass of the web in the forward direction. The web is moved back and forth between the takeup roll and the supply roll, but toner is supplied to the latent image only in the forward direction of travel, the reverse travel sometimes being used for web registration measurements.

In order to economize on the cost of the electronics, the plotting or printing speed is allowed to vary. In areas where the latent image being formed is relatively complex, the paper speed is slowed in order to allow data processing or rasterizing by a relatively inexpensive processor to keep up with the demand. A similar process occurs in facsimile machines where transmission automatically slows for complex patterns but is considerably faster for blank or low information contents paper to maximize throughput. Typically, the web speed can vary by a factor of ten or so.

Paper speed and position can be controlled through the use of a precision shaft encoder attached either to the takeup roll or to an idler wheel running on the paper surface together with tracking marks written along one or both edges of the web, outside the image areas. Generally, the more stringent are the accuracy and color dot registration requirements, the more complex is the encoder/marking system used for web position control. For good image quality, it is necessary to use regular or periodic marks, usually black, along either one or both web edges.

The marks are read optically and the resulting position information is used to control both the motors driving the paper motion as well as the timing of the deposition of latent image charge by the writing head. The marks may also be used to correct lateral, i.e. across the web, position of the writing so that the image being created follows lateral web positional errors. It is exceedingly difficult to make paper track accurately in multi-pass printers and plotters. The use of tracking marks has been found very useful in correcting these tracking errors by physically moving the write head laterally in such a manner that it "follows" the web position.

In the case of a scanning or shuttle type writing head, only the timing of the charge deposition need be varied to correct lateral web position errors.

Because the web is immediately toned after latent image generation, the speed of the web varies as it passes over the toner applicator just as it does in the area of the write head. Toners have been formulated so as to be tolerant of this speed variation, i.e., the colors come out more or less the same regardless of speed variations through the toning station.

Considerable sacrifice in color saturation and some variation in hue are the price paid for this variable speed toning. If the toning were done at a single, predetermined web speed, a toner set could be formulated which would give better colors and better color uniformity. With the increasing non-engineering applications of computer driven printing and plotting technology, which require picture quality comparable to photography, the advantages of constant-speed toning are becoming ever more important.

The problems with variable speed toning arise from the need to completely neutralize the image electrically during toning. If any latent image charge remains after toning with a given color, it will still be present when a subsequent color is used for toning and it will cause deposition of the subsequent color on top of the previous toned layer where it is not wanted. As an example, an image portion may be cyan. If the cyan latent image is incompletely neutralized during cyan toning, some of the "cyan" latent charge will remain and, during a subsequent magenta toning pass, magenta toner particles will deposit on the "cyan" area causing color contamination and serious darkening of the desired cyan color. In fact, every color has the potential problem of being so contaminated by the subsequent color pass if there is any such "residual potential". This problem is so serious that it has led to a special color sequence, namely BCMY (black, cyan, magenta, and yellow) for most electrostatic applications. By going, generally, from darker to lighter colors in sequence, the contamination effect is that of a lighter color on top of a darker one and this is less serious than the other way around. In other color imaging technologies, this is unnecessary. The final color employed in electrostatic printing, usually yellow, can exhibit a high residual potential without harm as there is no subsequent toning pass.

Residual potential problems and color contamination can be minimized only by increasing the electrical conductivity of the toner. Only in this way can it be assured that the residual potential is held within acceptable limits. Latent image charge neutralization is a function of the toner's electrical conductivity and the effectiveness of the particular toner applicator design. If either the toner is too insulating or the applicator is not sufficiently effective, excess residual potential will cause serious color degradation. Generally, the amount of residual charge which can be tolerated is about 5 percent of the original image charge level, i.e. at least 95 percent of the latent image must be neutralized in the act of toning with a given color other than the final color. The requirement varies with application, however, and the requirement may reach 98 percent neutralization in some cases or even more.

When printing at slow speeds, as in the case of very complex images, this neutralization requirement is easily met, but when the printed area is simple, allowing high web speeds, it is difficult to adequately neutralize the latent image by toning. The problem is worst for printed images which include both simple/fast areas and complex/slow areas. This is because the human eye is especially sensitive to color variations which are not supposed to be there. This problem has led to serious compromises in toner formulation as explained below.

In an electrostatic toner there are always charged and colored particles which are the desired materials for creating the visible colored output image. There are also charged but colorless ions which can help neutralize the latent image and reduce the residual potential, but they contribute nothing to the color on the output print. These ions actually detract from the desired color because they substitute for the toner particles, using up some to the latent image without producing any visible results. While some level of ions are necessarily present in any liquid toner, variable speed toning has led directly to a high level of ions as compared to colored particles for two different reasons. First, a high level of ions helps reduce residual potential by assisting the charged, colored particles in neutralizing the latent image charge. In addition, it has been found that the ions can, if the toning process is very prolonged, remove some of the already deposited colored particles by substituting for them. This sounds undesirable, and it is, but it is useful in keeping the color more or less uniform as toning is prolonged at very slow web speeds. Rather than getting more and more color saturation in very complex areas which run very slowly, the removal process compensates for the particles which are slowly depositing. The net effect is that colors can be more-or-less unchanged even when the web speed varies by a factor of five or more. It is not uncommon to have speed variations of ten to one, in fact.

It might be thought that complete charge neutralization could be achieved simply by increasing the number of colored particles, i.e. the concentration of the toner without adding ions which detract from the image. While it is true that simply adding more charged particles does increase toner conductivity and reduce residual potential, unfortunately, excess colored particles also contribute to background staining and this limits the "solids content" of practical toner formulations. The real solution is to formulate toners with fewer ions so the particles have less competition for the available image charge. This requires toning at relatively fixed speed. By restricting toning speed variations to a narrow range of some ten or twenty percent, the level of ions can be dramatically reduced leading to image benefits.

Colored toners which behave in a speed-independent manner are supplied by Hilord Chemical Corporation, Hauppauge, N.Y. and by Specialty Toner Corporation, Fairfield, N.J. Such colored sets of toners are formulated for specific printers and plotters because of the variation in effectiveness of different applicator designs, i.e. less effective applicators require more ions in order to achieve this speed independence. If the applicator is made more effective, generally at higher cost, the problem can be minimized but the basic source of the difficulty is the varying speed of the toning process caused by the economies of image creation at variable speed. Only by toning at a fixed and predetermined web speed can the level of ions in the toner be minimized and maximum color performance achieved. A toner set which is specifically formulated for a given applicator which is operated at a fixed web speed is truly the best that can be done with that applicator. Color saturation is optimized and there is no chance for speed variations or excess residual potentials to occur. It is therefore highly desirable to write the latent image at variable speed so as reduce equipment cost and it is equally desirable to tone that latent image at a fixed and predetermined web speed.

In principle a slack-loop of web could be accumulated between the write head and the toning station so as to permit constant-speed toning while keeping the cost advantages of variable speed image creation. In practice, this is impractical because the future complexity of the plot cannot be predicted and, essentially, the whole latent image would have to be accumulated and the toning started after creating the entire latent image. The mechanical problems of accumulating up to 40 feet of paper or film in a slack-loop are also daunting.

An object of the invention was to devise a more efficient toning process with better color saturation and hue properties.

SUMMARY OF THE INVENTION

The above object has been achieved with an electrostatic printing process which allows image writing to be done at variable speed but toning done in a reverse direction pass at constant speed while rewinding the web in preparation for the next latent image writing pass associated with another color of the same composite image. Rewinding at constant speed allows application of toner to be more uniform. Higher quality toners may be used. This procedure decouples the toning process from the image writing process so that the writing and the toning process may each be independently optimized.

A color electrostatic image is formed on a web by winding a web of image receiving material from a supply roll toward a takeup roll. Alternatively, metering of sheet material using edge marks may be used. Start and stop marks are noted and further motion may be with reference to the start and stop marks. An image area is defined on the web or sheet in the usual way and an electrostatic image is written at variable speed on the image area one color at a time. Once the image of a first color is written, the direction of winding or metering is reversed so that the image area moves toward the supply roll in a reverse direction at a constant speed. While moving in the reverse direction, liquid toner of the first color is applied at a toning station. After toner is applied the web direction is reversed, again traveling from the supply roll to the takeup roll. During this travel, an electrostatic image of a second color is written at a variable speed. Upon completion of the writing pass, the direction of travel is again reversed, with motion at a constant speed so that toner of the second color can be applied. This process is repeated until each color has been written in one direction and toned in the reverse direction, thereby forming a fully developed composite image.

In this manner, a charged web carrying a latent image, perhaps forty feet long, can be rolled up on a takeup roller and toning performed while rewinding the web in preparation for the next color pass. Very large color images may be formed having almost a photographic quality, hue and saturation.

BEST MODE FOR CARRYING OUT THE INVENTION

Figure 1:
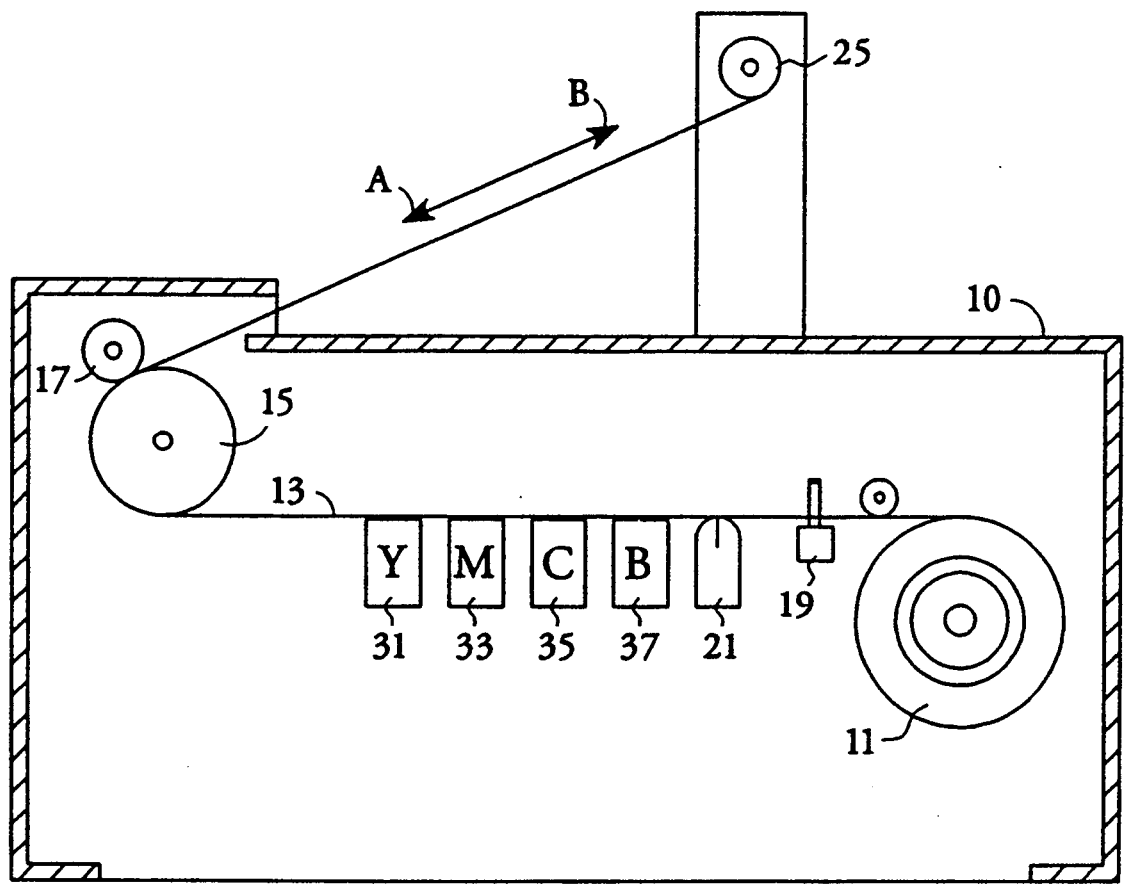
FIG. 1 is a side plan view of a printer operating in accord with the present invention.

With reference to FIG. 1, an electrostatic printer is generally contained in housing 10. The following example mentions paper as the image receptor, but film or other charge sensitive sheet media could be used. A paper supply roll 11, mounted within the housing, feeds a web 13 of paper toward a tensioning roller 15 and the idler 17. The paper passes an optical detector 19 which reads tracking marks along the edge of the paper for proper metering, positioning and speed control of the paper, in accord with prior art teachings. For example, see U.S. Pat. No. 4,569,584 to St. John et al.

Writing head 21 deposits an electrostatic charge on the paper corresponding to a latent image of one color. The writing head may be a small writing head of the scanning type, moving back and forth across the width of the paper, or it may be a full-width head. Downstream of the writing head is a toning station, providing toning shoes 31 for yellow, 33 for magenta, 35 for cyan, and 37 for black. Each color is applied separately, one color for each pass during reverse travel of the toning web. Paper is moved back and forth in the direction of arrows A and B by motion of the tensioning roller 15 and the take-up roller 25, in combination with the supply roller 11 using servo controlled motors.

As paper is fed off the supply roller 11, a first latent image corresponding to one color, for example cyan, is written by the writing head 21. Paper advances past the writing head toward the take-up roll 25, at a variable speed, depending upon the complexity of the drawing, as mentioned previously. Once the latent image of one color has been written and partially or completely wound on the take-up roll 25, the direction of paper travel is reversed, so that travel is now in the directtion of the arrow A. The charged image area now traveling toward the supply roll 11 passes the cyan toner applicator 35. The cyan applicator 35 is activated and toner is applied. The toner is usually in liquid form. It is also possible that a single shoe can be used for multiple colors, as explained in U.S. Pat. No. 04,987,429 to Finley et al. During the travel in the direction of arrow A, the image medium 13 moves at constant velocity, allowing high-quality, velocity-sensitive toners to be used. Once toning of the first color 31 is complete, the web is stopped, once the image area is to the right of the writing head 21, so that a latent image for the next color may be written.

The image area is now advanced in the direction of arrow B at variable speed, which causes the image area to move past writing head 21. The writing head applies a second latent image for the next color as the web is advanced past the writing head. After this image has been written, the web is stopped and its direction of travel is reversed, again moving in the direction of arrow A. Toner is now applied by the magenta applicator 33. Toning continues until the entire image area has been toned and the image area has moved back toward the supply roll 11 and past the magenta applicator 33 and the writing head 21. The image area will be wound onto roll 11 and, hence, the previously toned image should be dry prior to winding on the supply roll. An auxiliary drying mechanism such as an air bar may be used, as described in U.S. Pat. No. 4,870,462 to G. Day.

After toning with the second color has been completed and the image area rolled on the supply roll 11, the process is repeated for yellow and black toners. After all four colors have been applied, one after another, on sequential rewinding passes of the image area past the toning shoes, the image receiving material may be cut by a blade, not shown, and the drawing delivered at an output region. The colors may be applied in any order or combination, including the possibility of a single color by itself.

Alternatively, the web 13 can initially be moved from the supply roll 11 toward the take-up roll 25 in the direction of arrow B without the application of an electrostatic latent image. An electrostatic latent image of a first color is then written on the web 13 during motion of the web in the reverse direction, indicated by arrow A. Tone of the first color is then applied to the web 13 during motion in the direction of arrow B. Electrostatic images of other colors can then be written on the web 13 during travel in the direction of arrow A, followed by application of toners of the corresponding colors during subsequent motion of the web 13 in the direction of arrow B. As above, the web movement during electrostatic image writing is perferably at variable speed, whereas the movement during application of toner is preferably at constant speed.

A user might notice some charge decay of the latent image in the first portion of a written image area relative to the last region where a latent image is written. This could result in slightly more intense colors where there is less charge decay. To offset this situation, papers with higher charge retaining qualities should be used, especially where image quality is critical. Also, the image writing voltage may be adjusted to compensate for charge density decay so that the average charge density is constant at the time of toning and independent of latency time or contact with other surfaces, such as the backside of an image after rewind on the supply roll. Moreover, since improved toner formulations may be used, improved color saturation will exist which renders small variations in color intensity less visible to the eye. Improved toner formulations are made possible by use of a single speed on rewind, as mentioned above.

I claim:

1. A method for forming a visible image comprising, winding a web of image receiving material in a first direction from a supply roll toward a takeup roll, reversing the direction of winding such that the web moves toward the supply roll in a second direction, during web motion in the first direction, writing an electrostatic latent image on the web, during web motion at a subsequent time in the second direction, applying toner to the latent image.

2. The method of claim 1 wherein during electrostatic image writing, winding of the web is at variable speed.

3. The method of claim 1 wherein during applying of toner, winding of the web is at constant speed.

4. The method of claim 1 further defined by applying toner in liquid form simultaneously across a width of the web.

5. The method of claim 1 further defined by drying the web after applying toner to the latent image.

6. A method of forming a color electrostatic image on web material comprising,
   metering web material in a first direction from a starting point to a limit point while simultaneously writing an electrostatic latent image corresponding to a first color on the material,
   reversing web material motion in a second direction, opposite to the first direction, while applying toner to the latent image with one of a plurality of toners used to form a developed electrostatic color image,
   repeating the metering and reversing steps while writing further electrostatic latent images and applying other toners of said plurality of toners until all latent images are fully developed by application of said plurality of toners.

7. The method of claim 6 wherein during writing of said electrostatic latent image metering of the web is at variable speed.

8. The method of claim 6 wherein during applying of toner web material motion in the reverse direction is at constant speed.

9. A method of forming a visible image comprising, moving a recording medium in a first direction from a start point to an end point, moving the medium in a second direction opposite to the first direction and writing an electrostatic latent image on the medium while moving the medium in the second direction, and moving the medium in the first direction while applying a toner to the medium.

10. The method of claim 9 wherein moving the medium in the second direction while writing an electrostatic latent image is performed at variable speed.

11. The method of claim 9 wherein moving the medium in the first direction while applying a toner is performed at constant speed.

12. The method of claim 9 further comprising, moving the medium in the second direction while writing a second electrostatic latent image corresponding to a second toner, said second toner having a different color than that of the toner which has been previously applied to the medium, and moving the medium in the first direction while applying the second toner.

13. The method of claim 12 further comprising, moving the medium in the second direction while writing a third electrostatic latent image corresponding to a third toner, said third toner having a different color than that of the toners which have been previously applied to the medium, and moving the medium in the first direction while applying the third toner.

14. The method of claim 13 further comprising, moving the medium in the second direction while writing a fourth electrostatic latent image corresponding to a fourth toner, said fourth toner having a different color than that of the toners which have been applied to the medium, and moving the medium in the first direction while applying the fourth toner.

* * * * *